United States Patent [19]

Chung et al.

[11] Patent Number: 5,453,407
[45] Date of Patent: Sep. 26, 1995

[54] METHOD FOR PRODUCING NITRIDE CERAMIC POWDERS

[75] Inventors: Shyau L. Chung; Wei-Chang Lee, both of Tainan, Taiwan

[73] Assignee: National Science Council, Taipei, Taiwan

[21] Appl. No.: 196,287

[22] Filed: Feb. 14, 1994

[51] Int. Cl.⁶ .......................... C04B 35/58; C04B 35/584
[52] U.S. Cl. ................. 501/96; 501/97; 501/98; 423/409; 423/411; 423/412
[58] Field of Search ................. 901/96, 97, 98; 423/409, 411, 412

[56] References Cited

U.S. PATENT DOCUMENTS 4,459,363   7/1984   Holt .
4,944,930   7/1990   Holt et al. .
5,110,768   5/1992   Kaner et al. ............ 501/96

FOREIGN PATENT DOCUMENTS 64-76906   3/1989   Japan .
64-76905   3/1989   Japan .

Primary Examiner—Karl Group
Attorney, Agent, or Firm—Knobbe, Martens, Olson & Bear

[57] ABSTRACT

A method for producing nitride ceramic powders includes steps of a) providing a powder, b) providing a nitride, c) providing a salt of ammonium halide, d) mixing the powder, the nitride, and the salt to form a reactant, e) wrapping up the reactant with an igniting agent, f) placing the reactant wrapped up with the igniting agent in a vessel, g) evacuating the vessel, h) igniting the igniting agent for initiating a combustion reaction to form the nitride ceramic powders. Such method can permit excellent nitride ceramic powders to be effectively produced.

26 Claims, 3 Drawing Sheets

METHOD FOR PRODUCING NITRIDE CERAMIC POWDERS

BACKGROUND OF THE INVENTION

The present invention relates generally to a method for producing nitride ceramic powders, and more particularly to a combustion synthesis method thereof.

The family of nitride ceramic powders have the excellent properties such as high melting points, satisfactory hardnesses, excellent mechanical strengthes under high temperatures, and satisfactory chemical stabilities. Some even have excellent thermal conductivities. Therefore, they are widely applied in many fields. For example, silicon nitride is acknowledged as one of the best materials for engines, turbines and other high temperature applications, and aluminum nitride is very important in the applications of high-performance electronic substrate materials, optical lenses, cutting tools, heat sinks . . . etc.

Conventional methods for producing nitride ceramic powders include:

1) the direct nitridation method, e.g., $$3Si_{(s)} + 2N_{2(g)} \xrightarrow{>1200° C.} Si_3N_{4(s)} \text{ or}$$

$$2Al + N_2 \xrightarrow{>1000° C.} 2AlN;$$

2) the carbothermal reduction and nitridation method, e.g., $$3SiO_{2(s)} + 6C_{(s)} + 2N_{2(g)} \xrightarrow{1400° C.-1600° C.}$$

$$Si_3N_{4(s)} + 6CO_{(g)}, \text{ or } Al_2O_3 + N_2 +$$

$$3C \xrightarrow{1000° C.-1700° C.} 2AlN + 3CO;$$

3) the imide decomposition method, e.g., $$SiCl_{4(aq)} + 6NH_{3(aq)} \rightarrow Si(NH)_{2(s)} + 4NH_4Cl$$

and $$3Si(NH)_{2(s)} \rightarrow Si_3N_{4(s)} + 2NH_{3(g)};$$

4) the vapor-phase synthesis method, e.g., $$3SiCl_{4(g)} + 4NH_{3(g)} \rightarrow Si_3N_{4(s)} + 12HCl_{(g)};$$

and 5) the combustion synthesis method.

The direct nitridation method and the carbothermal reduction and nitridation method are both processed under high temperatures (e.g., from about 1000° C. to about 1700° C.) for long periods of time (e.g., from about 5 hours to about 10 hours) to fully complete the reaction. These method have the following disadvantages:

A) they take relatively much time;
B) they consume relatively much energy;
C) their conversions are relatively low; and
D) the purities of their products are relatively low.

The imide decomposition method has disadvantages as follows:

A) its cost is relatively high;
B) it involves relatively many steps; and
C) it takes relatively much time.

The vapor-phase synthesis method has these disadvantages:

A) it consumes relatively much energy;
B) the production rate is relatively low; and
C) it is hard to collect the obtained powder.

Compared with the aforementioned four methods, the combustion synthesis method is a new technique. It applies the self-propagating combustion reaction to synthesize ceramic materials, and has the following advantages:

A) the reaction is relatively fast;
B) it consumes much less energy than the aforementioned methods do;
C) the production procedure is relatively simple; and
D) mass production can be easily achieved.

The conventional techniques applying the combustion synthesis method for production of nitride ceramic powders include:

1) U.S. Pat. No. 4,459,363 entitled SYNTHESIS OF REFRACTORY MATERIALS discloses a method for synthesizing refractory nitride materials. The steps include mixing a metal azide with Ca or Mg and at least a stoichiometric amount of a metal oxide selected from the rare earth metals, the metals of the III-A, IV-A, III-B, and IV-B groups, or a mixture thereof, heating the resulting mixture until the ignition temperature is attained, and allowing the mixture to combust in a self-propagating manner to form a refractory nitride composition.

2) U.S. Pat. No. 4,944,930 entitled SYNTHESIS OF FINE-GRAINED α-SILICON NITRIDE BY A COMBUSTION PROCESS discloses a method for the combustion synthesis of α-silicon nitride. The steps include dry-mixing silicon powder with an alkali metal azide, such as sodium azide, cold-pressing the mixture into any desired shape, or loading the mixture into a fused, quartz crucible, loading the crucible into a combustion chamber, pressurizing the chamber with nitrogen and igniting the mixture using an igniter pellet, and isolating the α-silicon nitride formed as a reaction product.

3) The Japanese PAT. PUBLICATION NO. 64-76906 discloses a method for producing a nitride powder. The method includes steps of mixing a powdery metal and the metal nitride in an appropriate ratio to form a mixture, placing the mixture in a porous, refractory vessel surrounded by liquid nitrogen, and igniting the synthesis reaction by electrical heating to form a powdery nitride product.

4) The Japanese PAT. PUBLICATION NO. 64-76905 discloses a method for producing nitride powders. The method includes steps of mixing a powdery metal and $NaN_3$ (or other solid-state nitride, e.g., $KN_3$, $Ba_3N_2$ etc.) in an appropriate ratio to form a mixture, putting the mixture into a refractory vessel, placing an igniting agent on the top of the powdery mixture, placing the vessel with the mixture in an electrical to oven which is enclosed in a container filled with $N_2$ gas (having a pressure smaller than 10 kg/cm$^2$), heating the powdery Al and $NaN_3$ in the oven, and igniting the igniting agent to start and complete the combustion synthesis reaction and to form a powdery nitride product.

As mentioned above, using the combustion synthesis method, we have to overcome the following key problems:

I) how to supply sufficient nitrogen and how to make nitrogen to be mixed thoroughly with the metal powder;

II) how to fully complete the reaction; and

III) how to have the obtained powder to exist stably.

According to the reported study, when some nitrides such as $Si_3N_4$ and BN are to be synthesized, the pressure must be greater than 500 atm to start the reaction if nitrogen gas is used as the nitrogen source.

If liquid nitrogen is used as the nitrogen source (such as the Japanese PAT. PUBLICATION NO. 64-76906), the high pressure of $N_2$ gas is not necessary. Whereas, this will result in a higher cost for the apparatus and operation, and in more complexity and danger during the operation.

When a solid-state nitride is used as the nitrogen source (such as the U.S. Pat. No. 4,459,363, the U.S. Pat. No. 4,944,930 and the Japanese PAT. NO. 64-76905), the high pressure of nitrogen gas is not necessary, either. While, in order that the reaction can proceed in a self-propagating combustion manner, the solid-state nitride must be easily decomposable and the reaction must be well-controlled so that the nitrogen produced by the decomposition can rapidly react with the powdery Al. Otherwise, there will be a resulting high pressure and the reaction is no more operative due to the fact that the nitrogen gas is escaping. Besides, a proper design for permitting the obtained powder to stably exist is also necessary.

It is therefore attempted by the Applicant to deal with the above situation encountered by the prior art.

SUMMARY OF THE INVENTION

An objective of the present invention is to provide a method of producing excellent nitride ceramic powders. A further objective of the present invention is to provide a method of effectively producing nitride ceramic powders. In accordance with one aspect of the present invention, a method for producing nitride ceramic powders includes steps of a) providing a powder, b) providing a nitride, c) providing a salt of ammonium halide, d) mixing the powder, the nitride, and the salt to form a reactant, e) wrapping up the reactant with an igniting agent, f) placing the reactant wrapped up with the igniting agent in a vessel, g) evacuating the vessel, h) igniting the igniting agent for initiating a combustion reaction to form the nitride ceramic powder.

Certainly, the method can further include: step i) filling a nitrogen in the vessel before the step h).

Certainly, the powder can be one selected from a group consisting of Si, B, Al, Zr, Ti, Cr, Zr, and V powders. Alternatively, the powder can include at least two selected from a group consisting of Si, B, Al, Zr, Ti, Cr, Zr, and V powders.

Certainly, the nitride can be powder-shaped. The nitride can be one selected from a group consisting of $NaN_3$, $KN_3$, $Ba_3N_2$, and $CH_3N_5 \cdot H_2O$ powders. Alternatively, the nitride can include at least two selected from a group consisting of $NaN_3$, $KN_3$, $Ba_3N_2$, and $CH_3N_5 \cdot H_2O$ powders.

Certainly, the salt can be powder-shaped. The salt can be one selected from a group consisting of $NH_4Cl$, $NH_4Br$, and $NH_4I$. Alternatively, the salt can include at least two selected from a group consisting of $NH_4Cl$, $NH_4Br$, and $NH_4I$. Certainly, the powder, the nitride, and the salt can be mixed in a proper ratio, and then moulded to form the reactant.

Alternatively, the nitride and the salt can be first mixed in a proper ratio and moulded, and then surrounded by the powder to form the reactant.

Alternatively, the nitride and the salt can be first mixed in a proper ratio, then wrapped up with the powder to form the reactant.

Certainly, the reactant can be prepared with an addition of a proper amount of a diluent.

Certainly, the reactant wrapped up with the igniting agent can be moulded to form a desired shape. The desired shape can be a cylindrical one.

Certainly, the igniting agent can be easily combustible and be able to release a great amount of heat. The igniting agent can be one selected from a group consisting of titanium powder and graphite powder, titanium powder and carbon black powder, titanium powder and graphite powder and carbon black powder, titanium powder and silicon powder, and aluminum powder and ferrous-ferric oxide. Alternatively, the igniting agent can include at least two selected from a group consisting of titanium powder and graphite powder, titanium powder and carbon black powder, titanium powder and graphite powder and carbon black powder, titanium powder and silicon powder, and aluminum powder and ferrous-ferric oxide.

Certainly, the reactant can be first wrapped up with a metal layer, then wrapped up with the igniting agent. The metal layer can be an aluminum foil.

Certainly, the reactant can be first put into a porous refractory container, and then wrapped up with the igniting agent.

Certainly, the nitrogen can be about 1 atm to about 10 atm or above about 10 atm.

Certainly, the igniting agent can be ignited by one method selected from a group consisting of electrically heating, heating by W resistor, heating by graphite ribbon, and heating by a laser.

Certainly, the vessel can be vacuum- and pressure-resistant. The present invention can be more fully understood by reference to the following description and accompanying drawings, which form an integral part of this application.

DETAILED DESCRIPTION OF THE PREFERRED EMBODIMENT

The technology for producing nitride ceramic powders according to the present invention has four features:

1) It applies a powder (e.g., at least one selected from a group consisting of Si, B, Al, Zr, Ti, Cr, and V powders) and a solid-state nitride (e.g., at least one selected from a group consisting of $NaN_3$, $KN_3$, $Ba_3N_2$, and $CH_3N_5 \cdot H_2O$) as the reactant.

2) A salt of ammonium halide (e.g., at least one selected from a group consisting of $NH_4Cl$, $NH_4Br$, and $NH_4I$) is added into the reactant to allow the powder, the solid-state nitride and the salt of ammonium halide to be mixed in proper portions and then be moulded into an ingot of a proper shape (e.g., a cylindrical one). The ingot can also be obtained by first mixing the solid-state nitride and the salt of ammonium halide to be moulded into a proper shape, and then wrapping it up with the powder. When preparing the ingot, we can also add a diluting agent (e.g., the nitride ceramic powder).

3) The above-mentioned ingot is completely wrapped up with a proper igniting agent (e.g., the mixed powders Ti+C, or Al+$Fe_3O_4$). This step can be accomplished by putting the ingot into a mold of a proper size and shape, then pressurizedly covering the ingot with the powdery igniting agent. Before the ingot is wrapped up with the igniting agent, it can be wrapped up with a metal foil (e.g., Al foil), or placed in a porous refractory vessel.

4) The reactant ingot wrapped up with the igniting agent is placed in a vessel filled with $N_2$ gas. The igniting agent is ignited by heating with a proper heating device (e.g., a tungsten wire, graphite ribbon, or a laser) by which the igniting agent can be heated to a temperature ranging from about 800° C. to about 1600° C. to be ignited for triggering the combustion of the reactant ingot, thus synthesizing the high quality nitride ceramic powder. Although such reaction can take place in $N_2$ gas of a higher pressure, it requires an $N_2$ gas pressure from about 1 atm to about 10 atm. Most portion of the originally obtained product is nitride ceramic powder, whereas there is some salt of metal halide, and there is also a small amount of unreacted metal left under some operating conditions. The salt of metal halide can be removed by dissolving in water, and the metal can be removed by dissolving in a proper acid, so the high purity product can be obtained.

The most important differences between the present invention and the conventional combustion methods for producing the nitride ceramic powders lie in that according to the present invention the reactant ingot is wrapped up with an igniting agent and that the salt of ammonium halide is added into the reactant.

The reasons why the reactant ingot is wrapped up with an igniting agent include:

a) The high temperature quickly achieved by the combustion of the igniting agent can rapidly heat the reactant ingot up to a temperature high enough not only to cause the reactant nitride to decompose but also to cause the reaction between the nitrogen (obtained by the decomposition of the nitride) and the reactant powder to form the ceramic nitride powder.

b) The combustion product of the igniting agent (e.g., TiC or Fe+$Al_2O_3$) is quite dense to thus be resistant to the escape of the nitrogen. Therefore, the nitrogen is properly retained and this is much helpful to the synthesis of the nitride.

c) When the reactant ingot is covered with the metal foil or put into a porous vessel, and then wrapped up with the igniting agent, the interior nitrogen gas can be preferably retained. When the metal foil is applied, the interior high-pressure nitrogen gas dispels the molten metal foil to block up some openings where the nitrogen gas can escape, and then baffling the nitrogen gas from escaping. When a porous vessel is applied, the porous vessel is resistant to the escape of the nitrogen gas therein, and thus the nitrogen gas can also be retained.

d) Although the combustion product of the igniting agent is quite dense, it has a porosity through which the decomposed products (except $N_2$) of the reactant nitride and other pre-existing impurity materials can escape. Further, the combustion product (e.g., TiC) of the igniting agent is also a valuable product.

The reasons why the salt of ammonium halide is added into the reactant include:

a) Because the heat-absorbing effect of the salt of ammonium halide itself and the decomposition thereof, the combustion temperature can be lowered, and thus the decomposition of the product nitride can be slowed down. Thus, adding a proper amount of the salt of ammonium halide is helpful for the synthesis of the nitride.

b) The halogen resulting from the decomposition of the salt of the ammonium halide and the nitrogen resulting from the decomposition of the solid-state nitride will form a halogen-nitrogen activating material which will catalyze the aforementioned synthesis reaction.

c) The halogen resulting from the decomposition of the salt of the ammonium halide and the metal vapor resulting from the decomposition of the solid-state nitride will form a salt which can decrease the amount of the metal vapor escaping therefrom so as to reduce its etching to the involved instruments.

It is to be noticed that the addition of the salt of ammonium halide ($NH_4X$) is not helpful to the synthesis of AlN, i.e., without $NH_4X$, AlN can still be synthesized. While, as to the synthesis of other nitrides such as $Si_3N_4$, BN, ZrN, CrN . . . etc., the addition of $NH_4X$ is a must, i.e., without $NH_4X$, these nitrides cannot be synthesized.

The nitrogen pressure for synthesizing the nitride ceramic powders is dominated by the following factors:

1) the kind of the solid-state nitride;

2) the relative size of the volume of the ingot and the thickness of the igniting agent;

3) the kind of the igniting agent;

4) the particle size of the igniting agent; and 5) the density of the igniting agent.

Under general operating conditions, the nitrogen is desirely set to be at about 1 atm to about 10 atm. The properties of the obtained product such as the size, the shape and the dispersiveness of the particles can be controlled by the composition of the reactants, the density of the reactant ingot, the reaction temperature, the nitrogen pressure . . . etc.

Referred to FIGS. 1, 2 and 3, according to the present invention the operating procedures are depicted therein and described as follows:

First, a powder, a solid-state nitride powder, and a powdery salt of ammonium halide are mixed according to a proper mass ratio (taking the synthesis of $Si_3N_4$ for example, the mass ratio of Si:$NaN_3$:$NH_4Cl$=1:2:0.5) in a ball mill, or the like. The mixed powders are pressed into an ingot 11 of an appropriate shape with a die, and then the ingot 11 is then pressurizedly wrapped up with an igniting agent 12 to form a reactant ingot 10. Alternatively, a solid-state nitride and a salt of ammonium halide are first mixed completely according to a proper mass ratio, pressing the mixed powder into an ingot 23 of an appropriate shape with a die, putting the shaped mixed powder into a larger die, filling a proper amount of a powder 21 (e.g., Si) into the larger die, and applying a proper pressure to form an ingot 11'. The ingot 11' is then pressurizedly wrapped up with an igniting agent 22 to form a reactant ingot 10'. The reactant ingot 10 (10') is placed on a refractory plate 2 within a pressure vessel, and the plate 2 is seated on a height-adjustable platform 3. The platform 3 is utilized to adjust the distance between reactant ingot 10 (10') and the heating wire 4 to be about 2 mm to 3 mm. The pressure vessel is then sealed airtightly. The heating electrodes 5 and the thermocouples 6 for temperature measurement are extended outwards through the wall 7 of the vessel for being operated from outside. The vessel is evacuated to $10^{-1}$ Torr by a vacuum-discharging system 8, and then a high-purity nitrogen gas is introduced into the vessel till about 5 atm by a nitrogen-supplying system 9. The evacuation nitrogen and introducing steps are repeated several times to remove the pre-existing air in the vessel, and to remove the water absorbed on the reactant powders. Then, the high-purity $N_2$ gas is introduced into the vessel to a desired pressure for the synthesis reaction. Finally, a current of several amperes to tens of amperes is supplied to the heating wire 4 via the electrodes 5 in order to trigger the synthesis reaction.

Figure 1:
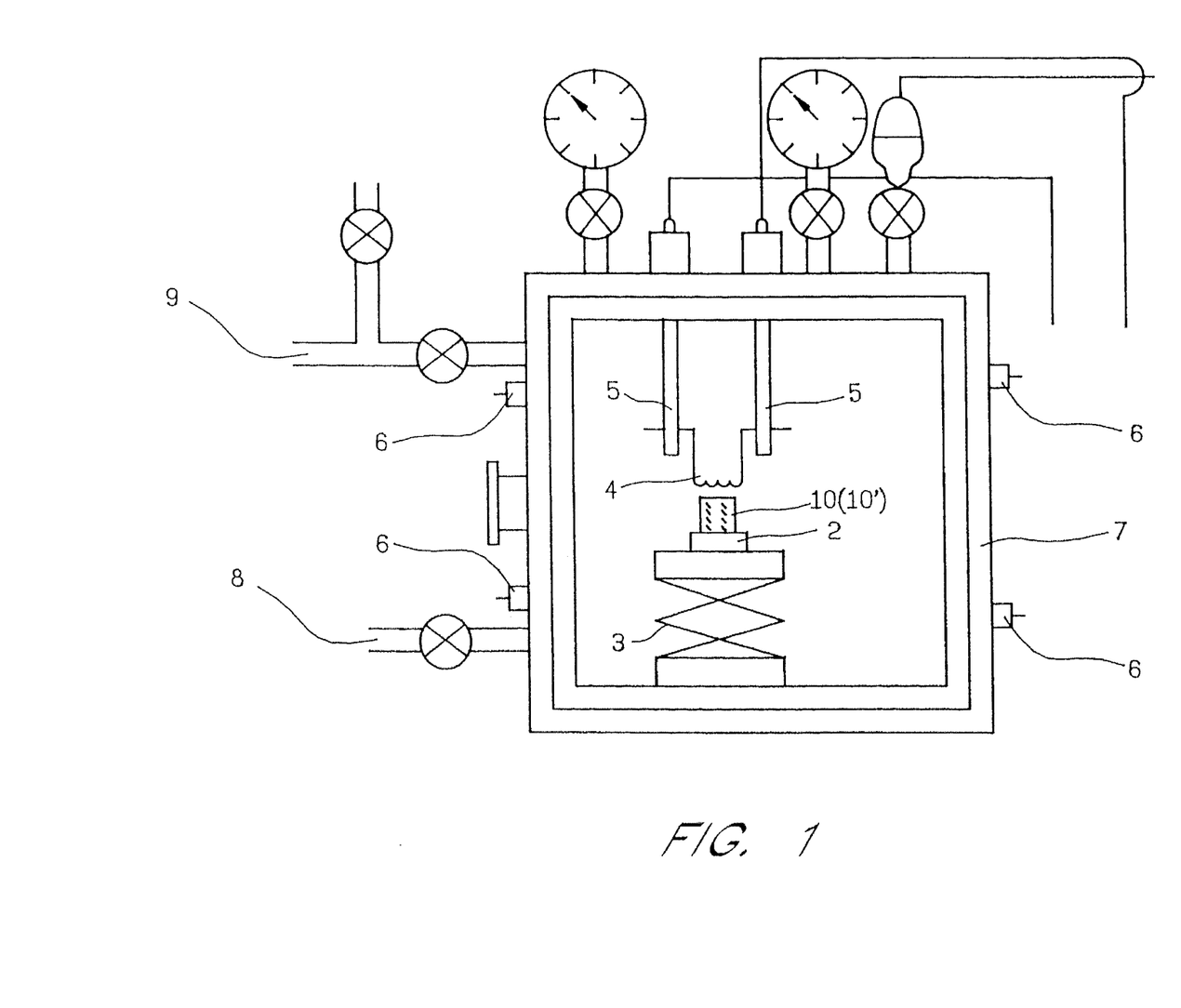
FIG. 1 shows a preferred embodiment of an instrument setup for the combustion-synthesis reaction according to the present invention.
Figure 2:
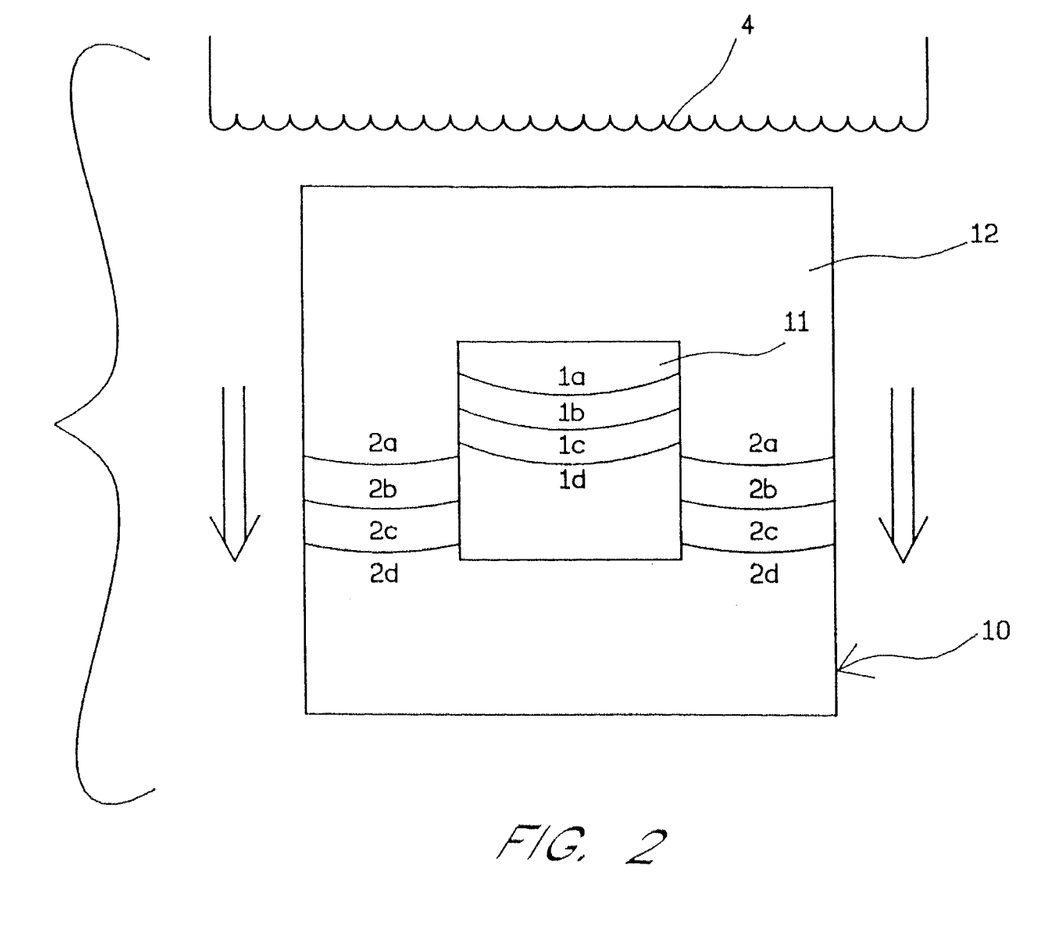
FIG. 2 schematically shows the first propagation status of the combustion synthesis reaction according to the present invention.

Referring to FIGS. 1 & 2, the reactant ingot 10 is ignited by the heating wire 4 to initiate the reaction forming the product 2a. At the same time, the reaction zone 2b generates much heat of reaction which heats the adjacent layer 2c to become a heating zone for the subsequent reaction. Such a self-propagation reaction means that the igniting agent is ignited at one side close to the heating wire 4, and that the reaction propagates by itself to the other side along the direction indicated by arrows in FIG. 2. The heat generated by the reaction of the igniting agent is transferred to the reactant ingot 11, thus triggering the synthesis reaction of the ingot 11, whereby the product (e.g., $Si_3N_4$) indicated by the symbol 1a is formed. At this time, the reaction zone indicated by the symbol 1b generates much heat of reaction which heats the adjacent layer 1c to become a heating zone to execute the subsequent synthesis reaction.

Figure 3:
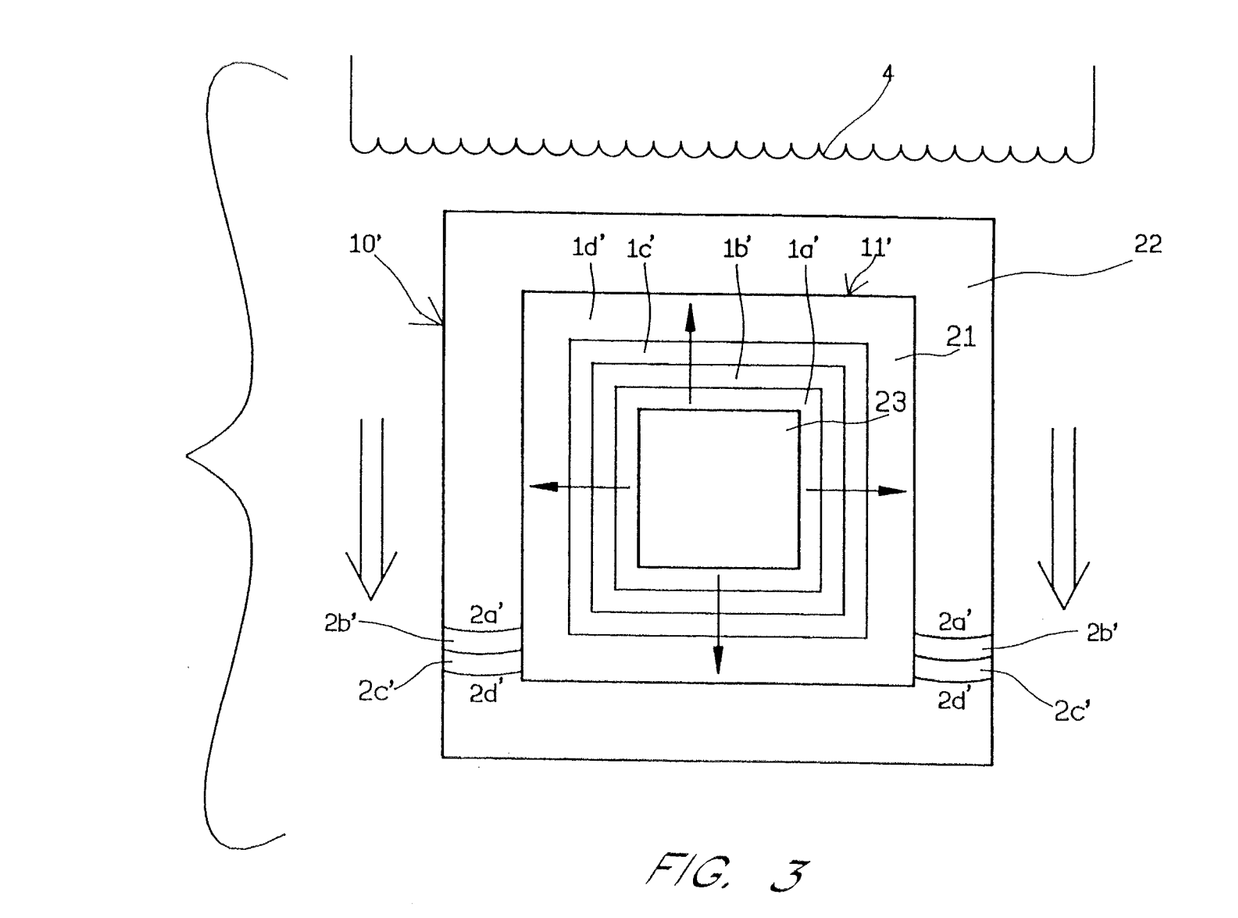
FIG. 3 schematically shows the second propagation status of the combustion synthesis reaction according to the present invention.

Referring to FIGS. 1 & 3, the reactant ingot 10' is ignited by the heating wire 4 to initiate the reaction forming the product 2a'. At the same time, the reaction zone 2b' generates much heat of reaction which heats the adjacent layer 2c' to become a heating zone for the subsequent reaction. During the self-propagation reaction, the resulting heat of reaction propagates to the ingot 23 and results in a large amount of nitrogen gas released from the solid-state nitride of the ingot 23. In accordance with the release of the nitrogen gas, the reaction zone indicated by the symbol 1b' generates much heat of reaction which heats the adjacent layer 1c' to become a heating zone to execute the subsequent synthesis reaction.

In brief, the reactant ingot 11 (11') is ignited by heating by the reaction of the igniting agent 12 (22), and a self-propagation reaction of the reactant ingot 10 (10') also occurs along the direction indicated by the arrows in FIGS. 2 & 3. When the reaction propagates to the end at the other side, the entire reactant ingot 10 (10') becomes a powdery nitride ceramic product (e.g., $Si_3N_4$). After the product is cooled, a release valve is opened to recover the pressure in the vessel to 1 atm. The vessel is then opened for the removal of the product, and the reaction product of the ceramic igniting agent is separated from the powdery nitride product by an appropriate manner, for example by peeling apart the igniting agent product which is in a laminated and loose structure. Finally, the loose powdery nitride ceramic product is obtained with a by-product from the reaction of the igniting agent.

Before the reactant ingot 10 (10') is wrapped up with the igniting agent, the ingot 11 (11') may be wrapped up with a metal (e.g., Al) foil, or placed in a porous refractory vessel. In both cases, the thickness of the wrapping igniting agent can be thinner, and the $N_2$ pressure needed for reaction can be lower. Other operation procedures and conditions are all the same to those described above.

During manufacturing the nitride ceramic powders of the present invention, the generated high heat not only causes the reactant nitride to decompose but also causes the other elements except nitrogen to evaporate. Consequently, no impurity element is found in the final ceramic products. If $NaN_3$ is used as a reactant, $NH_4Cl$ is used as the salt, and Ti+C is used as the igniting agent in the method of the present invention, the chemical reactions can be represented by:

Reaction of the igniting agent:

Reaction of the reactants:

In order to best understand the manufacturing method of the present invention, several examples are described hereinafter. It should be understood, however, that these examples do not intend to limit the scope of the present invention.

EXAMPLE 1

Si powder (−325 mesh), $NaN_3$ powder, and $NH_4Cl$ powder are mixed in a mass ratio of 1:2:0.6, and pressurizedly moulded (under a pressure of 144 MPa) to form a cylinder having a diameter of 1 cm and a length of 0.7 cm. This cylinder is further wrapped up with a mixture of Ti powder (−325 mesh) and carbon black powder powder (<100 nm), and pressurizedly moulded (under a pressure of 400 MPa) to form a final cylinder having a diameter of 1.7 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a white porous product.

The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is silicon nitride with the content of α-silicon nitride above about 94%.

EXAMPLE 2

Si powder (−325 mesh), $NaN_3$ powder, and $NH_4Cl$ powder are mixed in a mass ratio of 1:2:0.6, and pressurizedly moulded (under a pressure of 144 MPa) to form a cylinder having a diameter of 2.4 cm and a length of 0.7 cm. This cylinder is further wrapped up with a mixture of Ti powder (−325 mesh) and carbon black powder, and pressurizedly moulded (under a pressure of 400 MPa) to form a final cylinder having a diameter of 3 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping

EXAMPLE 3

Si powder (−325 mesh), $NaN_3$ powder, and $NH_4Cl$ powder are mixed in a mass ratio of 1:1.5:0.6, and pressurizedly moulded (under a pressure of 144 MPa) to form a cylinder having a diameter of 1 cm and a length of 0.7 cm. This cylinder is further wrapped up with a mixture of Ti powder (−325 mesh) and carbon black powder, and pressurizedly moulded (under a pressure of 400 MPa) to form a final cylinder having a diameter of 1.7 cm and a length of 1.5 cm. The final cylinder is put into a pressure vessel. The vessel is evacuated, and then the nitrogen is introduced till 5 atm is obtained. A tungsten wire supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a gray porous product. The porous product is first processed by a simple grinding, and is washed with 30 ml distilled water for 30 minutes and removed of NaCl by a centrifugal filtering procedure, and then is put into a solution of hydrofluoric acid and nitric acid (which are in a proper ratio and in a proper concentration) for 30 minutes and removed of unreacted silicon by a centrifugal filtering procedure, and is finally washed twice with a distilled water and dried to obtain a final white powdery product. An XRD analysis therefor shows that this powdery product entirely is silicon nitride with the content of α-silicon nitride above about 94%.

EXAMPLE 4

Si powder (−325 mesh), $NaN_3$ powder, and $NH_4Cl$ powder are mixed in a mass ratio of 1:2:0.3, and pressurizedly moulded (under a pressure of 144 MPa) to form a cylinder having a diameter of 1.0 cm and a length of 0.7 cm. This cylinder is further wrapped up with a mixture of Al powder (−200 mesh) and $Fe_3O_4$ powder, and pressurizedly moulded (under a pressure of 400 MPa) to form a final cylinder having a diameter of 1.7 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Al+$Fe_3O_4$, and then the interior formation reaction of $Si_3N_4$ is triggered right away. The reaction is completed within about 1 second to about 3 seconds. The wrapping igniting agent becomes a loose structure, and the reactant becomes a white porous product. The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is silicon nitride with the content of α-silicon nitride above about 94%.

EXAMPLE 5

Si powder (−325 mesh), $NaN_3$ powder, and $NH_4Cl$ powder are mixed in a mass ratio of 1:2:0.6, and pressurizedly moulded (under a pressure of 144 MPa) to form a cylinder having a diameter of 2.4 cm and a length of 0.7 cm. This cylinder is further wrapped up with a mixture of Ti powder (−325 mesh) and graphite powder (−325 mesh), and pressurizedly moulded (under a pressure of 400 MPa) to form a final cylinder having a diameter of 3 cm and a length of 1.5 cm. The final cylinder is put into a pressure vessel. The vessel is evacuated, and then the nitrogen is introduced till 7 atm is obtained. A graphite ribbon supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a white porous product. The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is silicon nitride with the content of α-silicon nitride above about 94%.

EXAMPLE 6

Si powder (−325 mesh), $NaN_3$ powder, and $NH_4Cl$ powder are mixed in a mass ratio of 1:2:0.6, and pressurizedly moulded (under a pressure of 144 MPa) to form a cylinder having a diameter of 1 cm and a length of 0.7 cm. This cylinder is first wrapped up with an Al foil and then wrapped up with a mixture of Ti powder (−325 mesh) and carbon black powder (<100 nm), and pressurizedly moulded (under a pressure of 400 MPa) to form a final cylinder having a diameter of 1.7 cm and a length of 1.5 cm. The final cylinder is put into a pressure vessel. The vessel is evacuated, and then the nitrogen is introduced till 6 atm is obtained. A tungsten wire supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a white porous product. The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is silicon nitride with the content of α-silicon nitride above about 94%.

EXAMPLE 7

Si powder (−325 mesh), $NaN_3$ powder, and $NH_4Cl$ are mixed in a mass ratio of 1:1.5:0.6, and put into a porous graphite vessel having an outer diameter 1.3 cm, an inner diameter of 1.0 cm, and a length of 1.0 cm. This vessel is further wrapped up with a mixture of Ti powder (−325 mesh) and carbon black powder (<100 nm), and pressurizedly moulded to form a final cylinder having a diameter of 3 cm and a length of 1.5 cm. The final cylinder is put into a pressure vessel. The vessel is evacuated and then the nitrogen is introduced therein till 6 atm is obtained. A tungsten wire supplied with a current is used to heat one end of the final cylinder so as to initiate the reaction of the Ti+C, and then the inner formation reaction of $Si_3N_4$ is triggered right away. The reaction is completed within about 1 second to about 3 seconds. The wrapping igniting agents becomes a laminated and loose structure, and the reactant becomes a white porous product. The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is silicon nitride with the content of $\alpha$-silicon nitride above about 94%.

EXAMPLE 8

Si powder (−325 mesh), $KN_3$ powder, and $NH_4Cl$ powder are mixed in a mass ratio of 1:2.5:0.8, and pressurizedly moulded (under a pressure of 144 MPa) to form a cylinder having a diameter of 1 cm and a length of 0.7 cm. This cylinder is further wrapped up with a mixture of Ti powder (−325 mesh) and carbon black powder (<100 nm), and pressurizedly moulded (under a pressure of 400 Mpa) to form a final cylinder having a diameter of 1.7 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a white porous product. The porous product is first processed by a simple grinding, and then is washed by 30 ml distilled water for 30 minutes, and is finally removed of KCl by a centrifugal filtering procedure and dried to obtain a final white powdery product. An XRD analysis therefor shows that this powdery product entirely is silicon nitride with the content of $\alpha$-silicon nitride above about 94%.

EXAMPLE 9

Si powder (−325 mesh), $Ba_3N_2$ powder, and $NH_4Cl$ powder are mixed in a mass ratio of 1:13.5:3.6, and pressurizedly moulded (under a pressure of 144 MPa) to form a cylinder having a diameter of 2.4 cm and a length of 0.7 cm. This cylinder is further wrapped up with a mixture of Ti powder (−325 mesh) and carbon black powder, and pressurizedly moulded (under a pressure of 400 MPa) to form a final cylinder having a diameter of 3 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a white porous product. The porous product is first processed by a simple grinding, and then is washed by 30 ml distilled water for 30 minutes, and is finally removed of $BaCl_2$ by a centrifugal filtering and dried to obtain a final white powdery product. An XRD analysis therefor shows that this powdery product entirely is an silicon nitride with the content of $\alpha$-silicon nitride above about 94%.

EXAMPLE 10

Si powder (−325 mesh), $NaN_3$ powder, and $NH_4I$ powder are mixed in a mass ratio of 1:2:1.6, and pressurizedly moulded (under a pressure of 144 MPa) to form a cylinder having a diameter of 1 cm and a length of 0.7 cm. This cylinder is further wrapped up with a mixture of Ti powder (−325 mesh) and carbon black powder (<100 nm), and pressurizedly moulded (under a pressure of 400 MPa) to form a final cylinder having a diameter of 1.7 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a white porous product. The porous product is first processed by a simple grinding, and then is washed by 30 ml distilled water for 30 minutes, and is finally removed of NaI by a centrifugal filtering procedure and dried to obtain a final white powdery product. An XRD analysis therefor shows that this powdery product entirely is silicon nitride with the content of $\alpha$-silicon nitride above about 94%.

EXAMPLE 11

Si powder (−325 mesh), $NaN_3$ powder, and $NH_4Br$ powder are mixed in a mass ratio of 1:2:1.1, and pressurizedly moulded (under a pressure of 144 MPa) to form a cylinder having a diameter of 2.4 cm and a length of 0.7 cm. This cylinder is further wrapped up with a mixture of Ti powder (−325 mesh) and carbon black powder (<100 nm), and pressurizedly moulded (under a pressure of 400 MPa) to form a final cylinder having a diameter of 3 cm and a length of 1.5 cm. The final cylinder is put into a pressure vessel. The vessel is evacuated, and then the nitrogen is introduced till 7 atm is obtained. A laser is used to heat one end of the final cylinder so as to initiate the reaction of the Ti+C, and then the interior formation reaction of $Si_3N_4$ is triggered right away. The reaction is completed within about 1 second to about 3 seconds. The wrapping igniting agent becomes a laminated and loose structure, and the reactant becomes a white porous product. The porous product is first processed by a simple grinding, and then is washed by 30 ml distilled water for 30 minutes, and is finally removed of NaBr by a centrifugal filtering and dried to obtain a final white powdery product. An XRD analysis therefor shows that this powdery product entirely is silicon nitride with the content of $\alpha$-silicon nitride is above about 94%.

EXAMPLE 12

Al powder (−100 mesh), $NaN_3$ powder, and $NH_4Cl$ powder are mixed in a mass ratio of 1:1.2:0.5, and pressurizedly molded (under a pressure of 144 MPa) to form a cylinder having a diameter of 1 cm and a length of 0.7 cm. This cylinder is first wrapped up with an Al foil and then wrapped up with a mixture of Ti powder (−325 mesh) and carbon black powder (<100 nm), and pressurizedly moulded (under a pressure of 400 MPa) to form a final cylinder having a diameter of 1.7 cm and a length of 1.5 cm. The final cylinder is put into a pressure vessel. The vessel is evacuated, and then nitrogen is introduced till 6 atm is obtained. A tungsten wire supplied with a current is used to heat one end of the final cylinder so as to initiate the reaction of the Ti+C, and then the interior formation reaction of AlN is triggered right away. The reaction is completed within about 1 second to about 3 seconds. The wrapping igniting agent becomes a laminated and loose structure, and the reactant becomes a white porous product. The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is AlN having a hexagonal crystallization.

EXAMPLE 13

B powder (<5 µm), $NaN_3$ powder, and $NH_4Cl$ powder are mixed in a mass ratio of 1:2.5:1, and pressurizedly moulded (under a pressure of 144 MPa) to form a cylinder having a diameter of 1 cm and a length of 0.7 cm. This cylinder is further wrapped up with a mixture of Ti powder (−325 mesh) and carbon black powder (<100 nm), and pressurizedly moulded (under a pressure of 400 MPa) to form a final cylinder having a diameter of 1.7 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of BN is triggered right away. The reaction is completed within about 1 second to about 3 seconds. The wrapping igniting agent becomes a laminated and loose structure, and the reactant becomes a porous product. The porous product is first processed by a simple grinding, and then is washed by 30 ml distilled water for 30 minutes, and is finally removed of NaCl by a centrifugal filtering procedure and dried to obtain a final powdery product. An XRD analysis therefor shows that this powdery product entirely is boron nitride.

EXAMPLE 14

Zr powder (−325 mesh), $NaN_3$ powder, and $NH_4Cl$ powder are mixed in a mass ratio of 1:1.1:0.4, and pressurizedly moulded (under a pressure of 144 MPa) to form a cylinder having a diameter of 2.4 cm and a length of 0.7 cm. This cylinder is further wrapped up with a mixture of Ti powder (−325 mesh) and carbon graphite powder (−325 mesh), and pressurizedly moulded (under a pressure of 400 MPa) to form a final cylinder having a diameter of 3 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of ZrN is triggered right away. The reaction is completed within about 1 second to about 3 seconds. The wrapping igniting agent becomes a laminated and loose structure, and the reactant becomes a porous product. The porous product is first processed by a simple grinding, and then is washed by 30 ml distilled water for 30 minutes, and is finally removed of NaCl by a centrifugal filtering procedure and dried to obtain a final powdery product. An XRD analysis therefor shows that this powdery product entirely is zirconium nitride.

EXAMPLE 15

Ti powder (−325 mesh), $NaN_3$ powder, and $NH_4Cl$ powder are mixed in a mass ratio of 1:0.6:0.3, and pressurizedly moulded (under a pressure of 144 MPa) to form a cylinder having a diameter of 2.4 cm and a length of 0.7 cm. This cylinder is further wrapped up with a mixture of Ti powder (−325 mesh) and carbon black powder (<1000 mesh), and pressurizedly moulded (under a pressure of 400 MPa) to form a final cylinder having a diameter of 3 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of TiN is triggered right away. The reaction is completed within about 1 second to about 3 seconds. The wrapping igniting agent becomes a laminated and loose structure, and the reactant becomes a golden porous product. The porous product is first processed by a simple grinding, and then is washed by 30 ml distilled water for 30 minutes, and is finally removed of NaCl by a centrifugal filtering procedure and dried to obtain a final golden powdery product. An XRD analysis therefor shows that this powdery product entirely is titanium nitride.

EXAMPLE 16

Cr powder (−325 mesh), $NaN_3$ powder, and $NH_4Cl$ powder are mixed in a mass ratio of 1:1.7:1.1, and pressurizedly moulded (under a pressure of 144 MPa) to form a cylinder having a diameter of 1 cm and a length of 0.7 cm. This cylinder is further wrapped up with a mixture of Al powder (−200 mesh) and $Fe_3O_4$ powder, and pressurizedly moulded (under a pressure of 400 Mpa) to form a final cylinder having a diameter of 1.7 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Al+$Fe_3O_4$, and then the interior formation reaction of CrN is triggered right away. The reaction is completed within about 1 second to about 3 seconds. The wrapping igniting agent becomes a laminated and loose structure, and the reactant becomes a porous product. The porous product is first processed by a simple grinding, and then is washed by 30 ml distilled water for 30 minutes, and is finally removed of NaCl by a centrifugal filtering procedure and dried to obtain a final powdery product. An XRD analysis therefor shows that this powdery product entirely is chromium nitride.

EXAMPLE 17

V powder (−325 mesh), $NaN_3$ powder, and $NH_4Cl$ powder are mixed in a mass ratio of 1:1.6:1.1, and pressurizedly moulded (under a pressure of 144 MPa) to form a cylinder having a diameter of 1 cm and a length of 0.7 cm. This cylinder is further wrapped up with a mixture of Ti powder (−325 mesh) and carbon black powder (<100 nm), and pressurizedly moulded (under a pressure of 400 MPa) to form a final cylinder having a diameter of 1.7 cm and a length of 1.5 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of VN is triggered right away. The reaction is completed within about 1 second to about 3 seconds. The wrapping igniting agent becomes a laminated and loose structure, and the reactant becomes a porous product. The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is vanadium nitride.

EXAMPLE 18

NaN$_3$ powder and NH$_4$Cl powder are mixed in a mass ratio of 3:1, and pressurizedly moulded (under a pressure of 144 MPa) to form a cylinder having a diameter of 1 cm and a length of 0.5 cm. This cylinder is further wrapped up with a mixture of Si powder (–325 mesh, and whose mass is one forth of that of the cylinder) and then wrapped up with a mixture of Ti powder (–325 mesh) and carbon black powder (<100 nm), and pressurizedly moulded (under a pressure of 400 MPa) to form a final cylinder having a diameter of 1.7 cm and a length of 1.3 cm. The final cylinder is put into a pressure vessel. The vessel is evacuated, and then the nitrogen is introduced till 7 atm is obtained. A tungsten wire supplied with a current is used to heat one end of the final cylinder so as to initiate the reaction of the Ti+C, and then the interior formation reaction of Si$_3$N$_4$ is triggered right away. The reaction is completed within about 1 second to about 3 seconds. The wrapping igniting agent becomes a laminated and loose structure, and the reactant becomes a porous product. The porous product is first processed by a simple grinding, and then is washed by 30 ml distilled water for 30 minutes, and is finally removed of NaCl by a centrifugal filtering procedure and dried to obtain a final white powdery product. An XRD analysis therefor shows that this powdery product entirely is silicon nitride with the content of α-silicon nitride above about 94%.

While the present invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims whose scope is to be accorded the broadest interpretation so as to encompass all such modifications and equivalent structures.

What is claimed is:

1. A method for producing nitride ceramic powders, comprising the steps of:
   a) providing a powder reactive with a nitride;
   b) providing said nitride;
   c) providing a salt of ammonium halide;
   d) forming a mixture of said powder, said nitride, and said salt to form a reactant;
   e) wrapping up said reactant with an igniting agent;
   f) placing said reactant wrapped up with said igniting agent in a vessel;
   g) evacuating said vessel; and
   h) igniting said igniting agent for initiating a combustion synthesis reaction to form said nitride ceramic powders.

2. A method according to claim 1, further comprising a step of filling a nitrogen in said vessel before said step h).

3. A method according to claim 2 wherein said powder is one selected from a group consisting of silicon, boron, aluminum, zirconium, titanium, chromium, and vanadium powders.

4. A method according to claim 2 wherein said powder includes at least two selected from a group consisting of silicon, boron, aluminum, zirconium, titanium, chromium, and vanadium powders.

5. A method according to claim 2 wherein said nitride of step b) is a powder.

6. A method according to claim 2 wherein said nitride is one selected from a group consisting of NAN$_3$, KN$_3$, Ba$_3$N$_4$, and CH$_3$N$_5$.H$_2$O powders.

7. A method according to claim 2 wherein said nitride includes at least two selected from a group consisting of NaN$_3$, KN$_3$, Ba$_3$N$_2$, and CH$_3$N$_5$.H$_2$O powders.

8. A method according to claim 2 wherein said salt is a powder.

9. A method according to claim 2 wherein said salt is one selected from a group consisting of NH$_4$Cl, NH$_4$Br, and NH$_4$I.

10. A method according to claim 2 wherein said salt includes at least two selected from a group consisting of NH$_4$Cl, NH$_4$Br, and NH$_4$I.

11. A method according to claim 2 wherein said reactant is formed by way of mixing and then molding said powder, said nitride, and said salt.

12. A method according to claim 2 wherein said reactant is formed by way of mixing said nitride and said salt first to obtain a mixture, molding said mixture, and then surrounding said molded mixture with said powder.

13. A method according to claim 2 wherein said reactant is formed by way of mixing said nitride and said salt first to obtain a mixture and wrapping said mixture with said powder.

14. A method according to claim 2 wherein said reactant is prepared with an addition of a proper amount of a diluent.

15. A method according to claim 2 wherein said reactant wrapped up with said igniting agent is molded to form a shape.

16. A method according to claim 15 wherein said shape is cylindrical.

17. A method according to claim 1 wherein said igniting agent is combustible and able to release an amount of heat sufficient to heat said reactant to an ignition temperature of said reactant.

18. A method according to claim 2 wherein said igniting agent is one selected from a group consisting of titanium powder and graphite powder, titanium powder and carbon black powder, titanium powder and graphite powder and carbon black powder, titanium powder and silicon powder, and aluminum powder and ferrous-ferric oxide powder.

19. A method according to claim 2 wherein said igniting agent includes at least two selected from a group consisting of titanium powder and graphite powder, titanium powder and carbon black powder, titanium powder and graphite powder and carbon black powder, titanium powder and silicon powder, and aluminum powder and ferrous-ferric oxide powder.

20. A method according to claim 2 wherein said reactant is first wrapped up with a metal layer, then wrapped up with said igniting agent.

21. A method according to claim 20 wherein said metal layer is an aluminum foil.

22. A method according to claim 2 wherein said reactant is first put into a porous, refractory container, and then wrapped up with said igniting agent.

23. A method according to claim 2 wherein said nitrogen is about 1 atm to about 10 atm.

24. A method according to claim 2 wherein said nitrogen is above about 10 atm.

25. A method according to claim 2 wherein said igniting agent is ignited by one method selected from a group consisting of electrical heating, heating by W resistor, heating by graphite ribbon, and heating by a laser.

26. A method according to claim 2 wherein said vessel is vacuum- and pressure-resistant.

* * * * *